United States Patent [19]

Sriram

[11] Patent Number: 5,463,620
[45] Date of Patent: Oct. 31, 1995

[54] BANDWIDTH ALLOCATION, TRANSMISSION SCHEDULING, AND CONGESTION AVOIDANCE IN BROADBAND ASYNCHRONOUS TRANSFER MODE NETWORKS

[75] Inventor: Kotikalapudi Sriram, Matawan, N.J.

[73] Assignee: AT&T IPM Corp., Coral Gables, Fla.

[21] Appl. No.: 200,375

[22] Filed: Feb. 22, 1994

Related U.S. Application Data

[63] Continuation of Ser. No. 968,091, Oct. 29, 1992, abandoned.

[51] Int. Cl.$^6$ .................................................. H04J 3/22
[52] U.S. Cl. ............................. 370/60; 370/94.1; 370/94.2
[58] Field of Search ............................. 370/60.1, 61, 94.2, 370/93, 92, 91, 60, 94.1, 95.1, 84, 85.6, 85.7, 58.1, 58.2, 58.3

[56] References Cited

U.S. PATENT DOCUMENTS

| | | | |
|---|---|---|---|
| 4,914,650 | 4/1990 | Sriram | 370/60 |
| 5,050,161 | 9/1991 | Golestani | 370/60 |
| 5,070,498 | 12/1991 | Kakuma | 370/94.1 |
| 5,121,383 | 6/1992 | Golestani | 370/94.1 |
| 5,132,966 | 7/1992 | Hayano et al. | 370/94.1 |
| 5,150,358 | 9/1992 | Purj et al. | 370/60 |
| 5,153,877 | 10/1992 | Esaki et al. | 370/60 |
| 5,164,938 | 11/1992 | Jurkevich et al. | 370/94.1 |
| 5,179,556 | 1/1993 | Turner | 370/94.1 |
| 5,231,633 | 7/1993 | Hluchyi et al. | 370/60 |

OTHER PUBLICATIONS

Sriram, K. et al., "An Integrated Access Terminal For Wideband Packet Networking: Design And Performance Overview," Proc. of The International Switching Symp., Stockholm, Jun. 1990, vol. 6, pp. 17–24.

*Primary Examiner*—Douglas W. Olms
*Assistant Examiner*—Huy D. Vu
*Attorney, Agent, or Firm*—Eugene S. Indyk

[57] ABSTRACT

A wide variety of call traffic is effectively integrated in a single broadband communications network. Calls having widely differing bandwidth requirements and sensitivities to delay are handled by the network with efficient, effective, and fair bandwidth allocation and transmission scheduling. This is accomplished by classifying each call in accordance with certain signal characteristics, such as required bandwidth and sensitivity to delay. Each call class is directed to a separate queuing circuit. Some calls in certain classes, such as those associated with high-bandwidth constant bit rate services, are each directed to their own individual queuing circuits. Other calls within a class are statistically multiplexed into a single queuing circuit for that class. A multiplexing circuit operates in accordance with a dynamic time slice scheme which involves defining a service cycle time period during which the multiplexer withdraws a predetermined number of information packets from each of a plurality of queuing circuits containing information packets and places those predetermined numbers of packets onto an output link. The multiplexer breaks up the cycle time period into a plurality of time slices, each of which determines how many information packets are transmitted from each queuing circuit during the cycle time period. Efficient resource usage and congestion avoidance are further achieved by using one of a number of alternative scheduling techniques for delay insensitive traffic.

25 Claims, 8 Drawing Sheets

HEADER FIELDS: (UNI)
- GENERIC FLOW CONTROL FIELD (4 BITS)
- VIRTUAL PATH FIELD (8 BITS)
- VIRTUAL CHANNEL FIELD (16 BITS)
- PAYLOAD TYPE (3 BITS)
- LOSS PRIORITY FIELD (1 BIT)
- HEADER CHECK SEQUENCE (8 BITS)

BANDWIDTH ALLOCATION, TRANSMISSION SCHEDULING, AND CONGESTION AVOIDANCE IN BROADBAND ASYNCHRONOUS TRANSFER MODE NETWORKS

This application is a continuation-in-part of application Ser. No. 07/968,091, filed on Oct. 29, 1992, abandoned.

TECHNICAL FIELD

This invention relates to high-speed communications networks. More particularly, this invention relates to bandwidth allocation, transmission scheduling, and congestion avoidance on broadband communications networks.

BACKGROUND

A significant amount of successful work has been done in the area of integrating voice and data signals on relatively low speed networks such as DS1 networks operating at 1.536 Mb/sec. and E1 networks operating at 2.048 Mb/sec. See, for example, U.S. Pat. No. 4,914,650 issued to K. Stiram which describes an integrated voice and data network having a bandwidth allocation and congestion control scheme involving separate queues for voice, data, and signaling. In the network described in the patent, voice packets are transmitted from the voice queue during a predetermined time interval T1 and data packets are then transmitted from the data queue for a predetermined time interval T2. Transmission of voice and data packets for intervals T1 and T2 is then repeated until the voice and data queues are depleted. If one or more signaling packets enter the signaling queue, transmission of voice and data packets is suspended and the signalling packets are transmitted until the signalling queue is empty.

SUMMARY

Broadband high-speed packet networks, such as those based on the broadband integrated services digital network (B-ISDN) standard and the asynchronous transfer mode (ATM) standard, are able to handle many more diverse kinds of traffic than the low-speed networks of the past. These diverse kinds of traffic include voice, interactive data, images, bulk data, and several different kinds of video. These different types of traffic vary widely in their bandwidth requirements and tolerance to message delay and loss. It would be economically unattractive to implement an individually designed network specifically tailored for each of these types of traffic. Thus, there is a critical need to efficiently integrate these diverse traffic types on a single network for high-speed networks to become a commercial reality. This invention meets that need by providing a cyclic service discipline which achieves efficient allocation of bandwidth, congestion avoidance, and fairness for the many different types of traffic handled in high-speed communications networks.

In one specific example of the invention, communications traffic in each node of a high-speed network is segregated in accordance with certain signal characteristics and stored in separate queuing circuits for delivery to a single output line under the control of a multiplexing circuit. This segregation may be based upon whether the communications traffic is high or low bandwidth, isochronous or non-isochronous, and delay sensitive or delay insensitive. A multiplexing circuit in each node defines a service cycle time period $D_c$ during which each of n queuing circuits is permitted to deliver cells to an output line connected to the node. A certain amount of bandwidth is guaranteed to the traffic flowing into each of the queuing circuits by allocating certain slices of time $T_1, T_2, \ldots T_n$ within the service cycle time period $D_c$ to each of the n queuing circuits. During its allocated time slice, a respective queuing circuit is allowed by the multiplexing circuit to empty a predetermined number of cells stored in the queuing circuit onto an output line of the network node.

For some types of traffic, such as constant bit rate services and non-real-time bulk information wansport services, a separate queuing circuit is provided for each call. A call involving constant bit rate services is admitted if there is sufficient unused bandwidth on the output link to guarantee the necessary bandwidth for the duration of the call. A call involving non-real-time bulk information transport services is admitted when there is sufficient unused storage and transmission capacity in the network to accommodate the call. For other types of traffic, such as variable bit rate services, multiple calls are statistically multiplexed into a single queuing circuit. A call involving a statistically multiplexed service is admitted when permitted to do so in light of information contained in traffic tables stored in the node. The traffic tables provide information relating the number of calls in a class to the amount of bandwidth required for that number of calls to be effectively statistically multiplexed.

This is just one example of this invention. Other examples will be readily apparent from the following detailed description read in conjunction with the appended claims which define the full scope of the invention.

DETAILED DESCRIPTION

Figure 1:
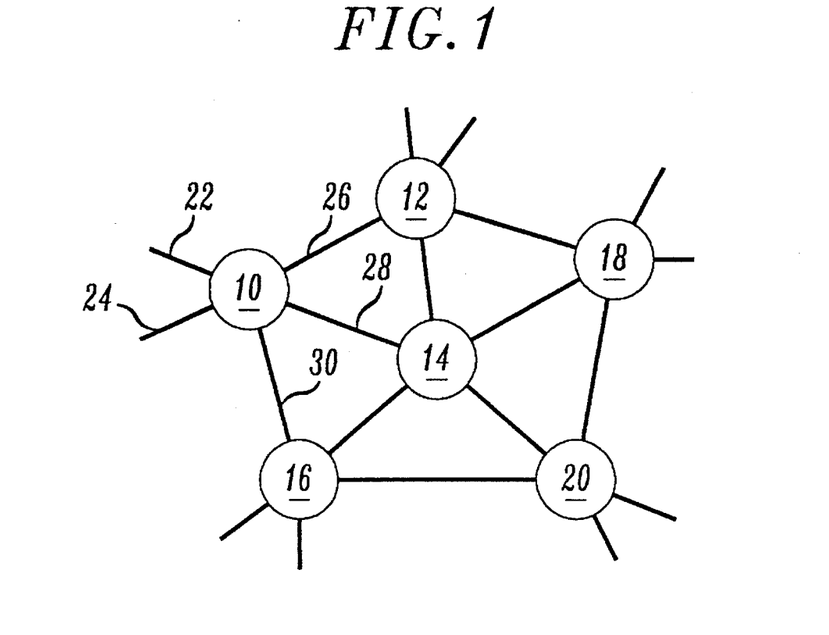
FIG. 1 is a schematic diagram of an illustrative asynchronous transfer mode communications network in accordance with this invention.

FIG. 1 illustrates a representative portion of an asynchronous mode transfer mode (ATM) communications network in accordance with this invention. The network comprises a plurality of interconnected nodes 10, 12, 14, 16, 18, and 20. Each node receives input signals on a plurality of input links and routes those input signals to one of a plurality of output links. For example, a typical node 10 receives input signals on input links 22 and 24 from another node in the network not shown in FIG. 1 and selectively directs those signals on output links 26, 28, and 30 to nodes 12, 14, and 16, respectively. The output links 26, 28, and 30 are thus input links to nodes 12, 14, and 16, respectively. Although not shown in FIG. 1, there may also be links directing signals from one or more of nodes 12, 14, and 16 to the node 10. The number of nodes in FIG. 1 and the way they are connected are merely illustrative of an ATM network in accordance with this invention. There may be any number of nodes in the network and they may be connected together in any suitable fashion so that each node has one or more ATM inputs and one or more ATM outputs. For example, the links between the nodes in the network may be optical fibers which transmit at rates of 150 Mbit/sec. or higher.

Figure 2:
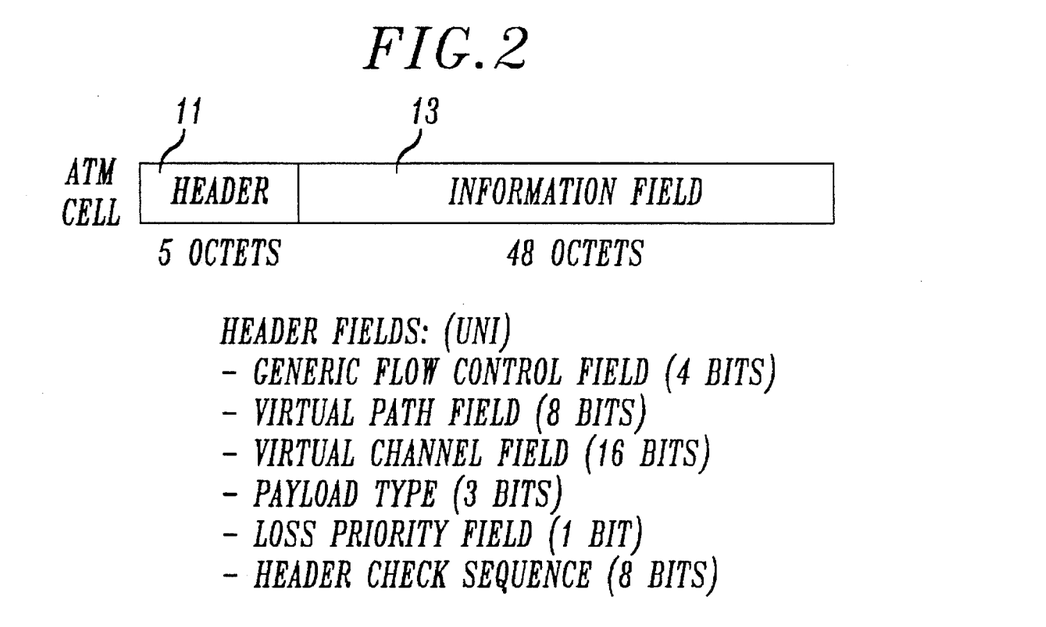
FIG. 2 illustrates the structure of an asynchronous transfer mode (ATM) cell which is used to transport information through the network of FIG. 1.

Information is transmitted through the network by means of special kinds of digital information packets known as ATM cells. ATM cells may be configured as shown in FIG. 2. Such an ATM cell may comprise two main parts, a header 11 and an information field 13. The header 11 may comprise 5 eight-bit digital words (called octets) used by the network to properly route the ATM cell through the network to its destination. The information field 13 may contain 48 eight-bit digital words (octets) representing the information being conveyed through the network, for example, voice samples, video samples or data. The header may contain several fields serving different purposes in assisting the routing of the cell through the network. It may contain generic flow control, virtual path, and virtual channel fields. It may also contain a loss priority field and a header check sequence. The header may also contain a field, which may be 3 bits in size, identifying the call type or payload of the ATM cell. An example of how an ATM cell may be configured is given in ATM standards of the CCITT.

Figure 3:
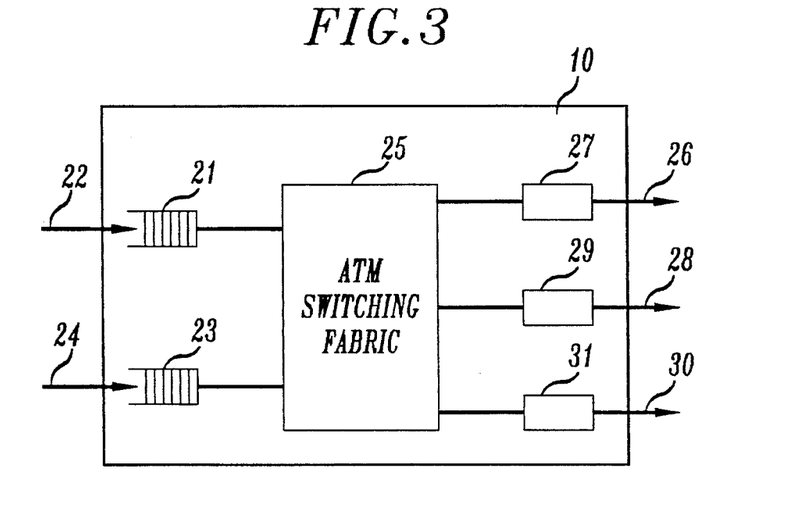
FIG. 3 is a detailed diagram of one of the network nodes shown in FIG. 1.

FIG. 3 illustrates the details of one of the network nodes in FIG. 1, for example, network node 10. Node 10 may comprise a plurality of input buffers, for example, input buffers 21 and 23. Each of the buffers may receive ATM cells from a respective input link 22 and 24 and may direct those ATM cells to an ATM switching fabric 25 which selectively switches ATM cells received from the input buffers 21 and 23 to multiplexers 27, 29, and 31 associated with each output link 26, 28, and 30 of the node 10.

As described in more detail below, call traffic through each of the nodes is classified in accordance with certain signal characteristics. Each of the output links from the nodes is provided with a queuing mechanism which receives ATM cells for delivery into a channel on the output link. There is at least one queue in the queuing mechanism for each traffic classification. A dynamic time slice server described in more detail below is associated with each output link. The server multiplexes the contents of the queuing mechanism onto its respective output link so that bandwidth is effectively and fairly allocated to a wide variety of traffic normally found in a high speed ATM network.

Figure 4:
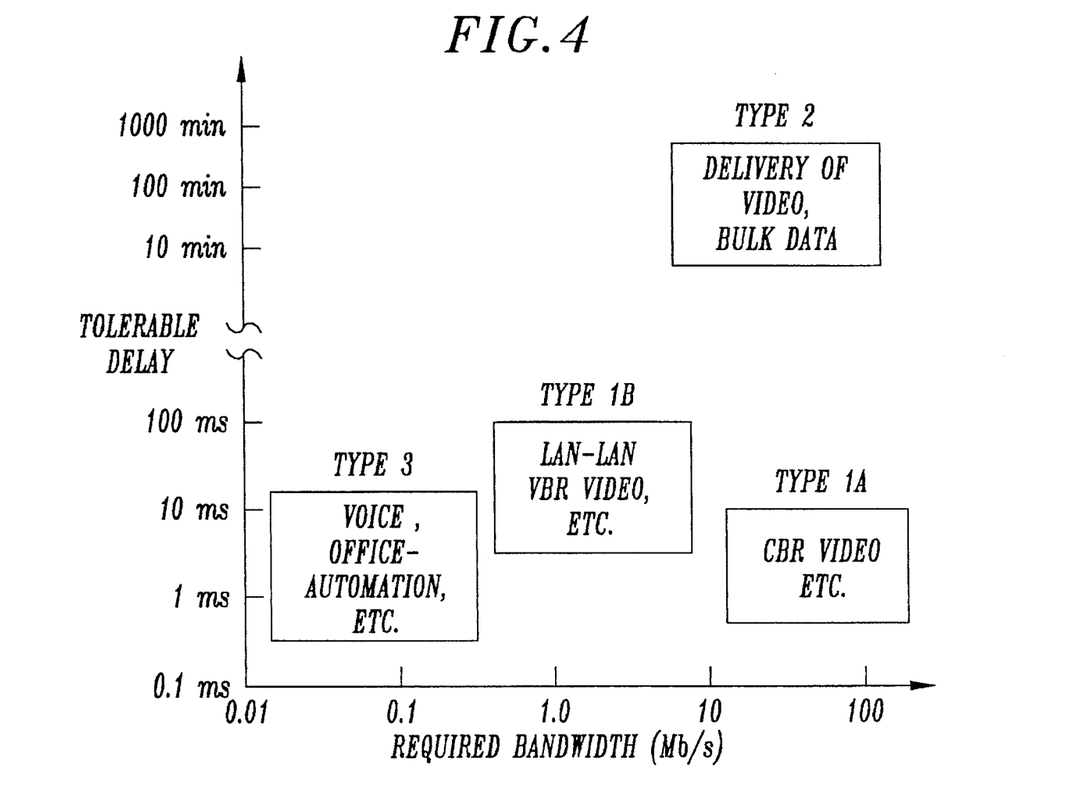
FIG. 4 is a graphical representation of the approximate required bandwidth and tolerable delay for the traffic classifications handled by the ATM network of FIG. 1.

Traffic types found in high speed ATM networks are classified as follows in this example of the invention. The approximate bandwidth required for examples of each of these traffic types, and the approximate tolerable delay for those examples, is graphically represented in FIG. 4.

Type 1A: Delay-Sensitive Isochronous High Bandwidth Services

This type of traffic is a real-time high bandwidth service (RT-HBS). It is isochronous because it requires a fixed high bandwidth for the duration of a call. It requires real time service and, therefore, guaranteeing bandwidth at the time of call setup is necessary. Examples of this kind of traffic are constant bit rate (CBR) conference video and other real time high bandwidth CBR services such as the IBM channel-to-channel interconnect. Fixed rate video may be delivered at rates of 10, 20, 45, or 90 Mb/sec., for example. Rates greater than 100 Mb/sec. are possible. The delay tolerance of this traffic type is typically on the order of no more than several tens of milliseconds.

Type 1B: Delay-Sensitive Non-Isochronous High Bandwidth Services

This traffic is also an RT-HBS type of service, but it is non-isochronous in that each call alternates between active and inactive periods. These services generate a high bandwidth data stream during the active periods. Examples of this type of traffic include variable bit rate (VBR) video and the traffic flowing on interconnections between local area networks (LAN-to-LAN interconnects). This type of traffic may be further divided into subclasses. For example, VBR video and LAN-to-LAN calls may be separately grouped for admission control, bandwidth allocation, and buffer management. This type of traffic may tolerate delays on the order of about 100 msec. The bandwidth requirement for a call of this type may range from about a fraction of 1 Mb/s to about several Mb/s.

Type 2: Delay-Insensitive High Bandwidth Services

This traffic comprises non-real-time bulk information transport services. The sender may specify the extent of delay which is tolerable between the sending and receipt of the information. The sender may specify the tolerable delay in minutes or hours or may specify overnight delivery, for example. There are several alternatives described in detail below for appropriately-serving this type of traffic. Essentially, the network transports this type of traffic during slack periods. Hence, there must be suitable ways of storing the bulk information in the network, identifying the slack periods in network activity, and scheduling the transmission of the information through the network. Examples of this traffic type include delivery services involving data, documents, images, and video.

Type 3: Low Bandwidth Statistically Multiplexed Services (SMS)

Calls of this type are delay sensitive with end-to-end delay requirements ranging from less than a millisecond to a few tens of milliseconds. The bandwidth range for such calls may be in the range of about 1 kb/sec. to more than about 100 kb/sec. Examples of such traffic include packetized voice, interactive data, inquiry response messages, images, e-mail, and other voice band data.

The traffic classification described here may be accomplished at a virtual circuit level. The header in each ATM cell may provide virtual channel identifier (VCI) information in a virtual channel field. Based on information obtained from the sending terminal at call setup time, the call type may be determined. Each ATM switch involved in the call routing can maintain a table which maps VCIs to call types for all the calls flowing through that switch. The detailed traffic classification scheme described above is used to implement appropriate resource sharing methods described below.

Figure 5:
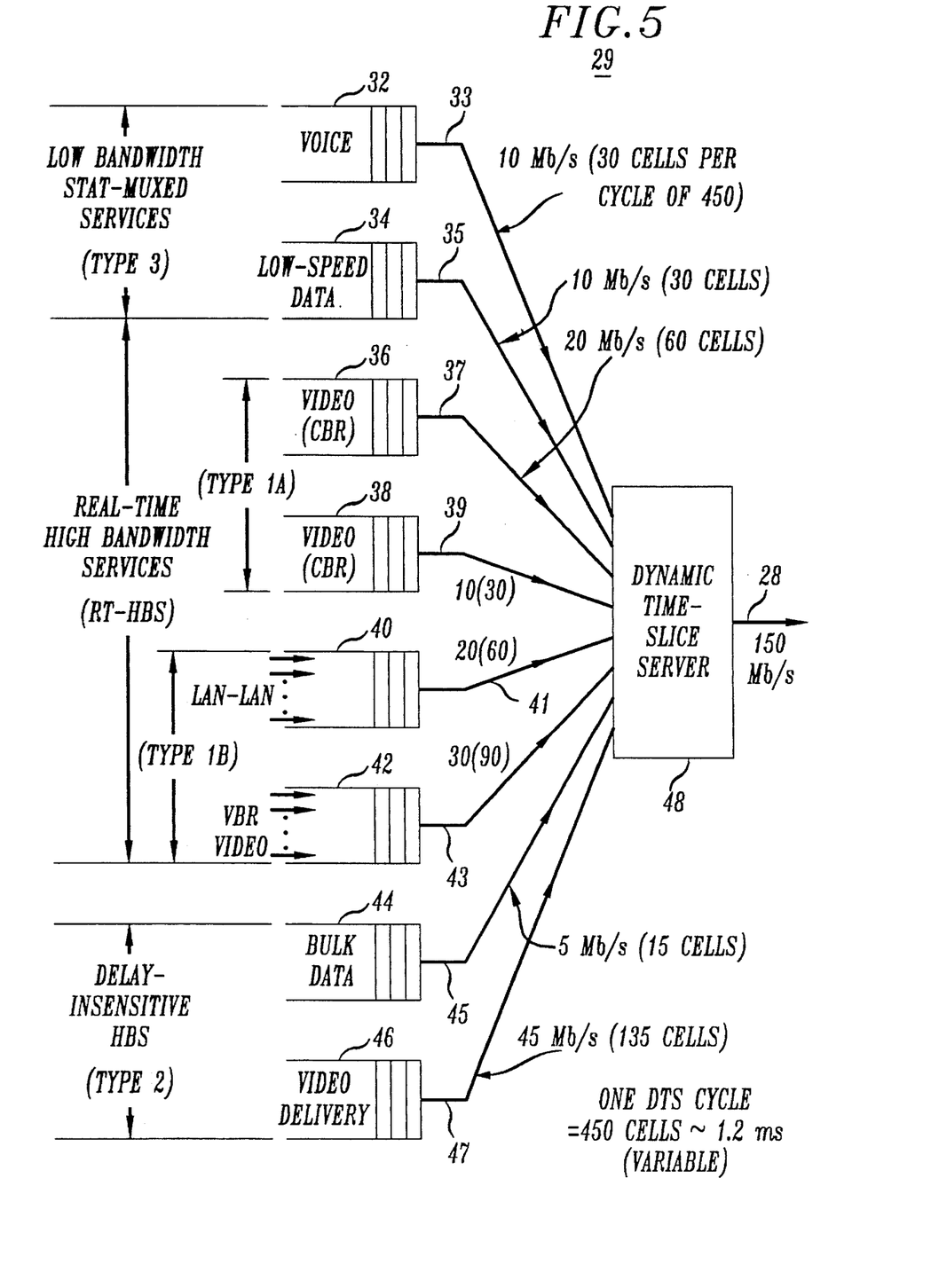
FIG. 5 is a schematic diagram of a dynamic time slice service apparatus used to control the allocation of bandwidth to calls and the multiplexing of ATM cells onto one of the output links associated with one of the nodes shown in FIG. 1.

FIG. 5 shows an illustrative circuit which multiplexes a wide variety of communications traffic in an ATM network onto an output link connecting two nodes of the network. Specifically, FIG. 5 illustrates a multiplexing circuit 29 in node 10 which combines communications traffic from a number of sources onto the output link 28 shown generally in FIGS. 1 and 3. As shown in FIG. 5, the output link 28 has an illustrative bandwidth of 150 Mb/sec. As described above, there may be similar circuits for each of the output links in the network of FIG. 1.

As described above, the communications traffic is classified in accordance with certain signal characteristics by the node 10. The traffic which is to be directed on the output link 28 is selectively directed to a number of different queuing circuits based upon the results of the classification. Specifically, the previously described Type 3 traffic is directed to queues 32 and 34 in FIG. 5. All of the voice traffic in the node 10 to be sent on the output link 28, which may comprise one or more voice calls, is statistically multiplexed into a voice queue 32. Similarly, all of the low-speed data traffic is statistically multiplexed into a low-speed data queue 34. Traffic relating to real time high bandwidth services, the Types 1A and 1B services described above, is directed to queuing circuits 36, 38, 40, and 42. Each call involving a Type 1A service is directed to its own queuing circuit in FIG. 5. Specifically, FIG. 5 shows two constant bit rate video calls, each of which is directed into separate queuing circuits 36 and 38, respectively. Type 1B calls are divided into two subclassifications in FIG. 5, namely, those calls involving LAN-to-LAN communications which are statistically multiplexed into the queuing circuit 40 and those calls involving variable bit rate video which are statistically multiplexed into the queuing circuit 42. Calls involving delay insensitive high bandwidth services, the previously described Type 3 services, are each directed to a separate queuing circuit. The circuit of FIG. 5 is handling two calls of this type, a bulk data transfer in a queuing circuit 44 and a bull video delivery call in a queuing circuit 46.

A dynamic time slice (DTS) server 48 defines a predetermined cycle time $D_c$ during which it visits each of the queuing circuits in sequence and withdraws a predetermined number of ATM cells from the queuing circuit and transfers that predetermined number of cells onto the output link 28. The predetermined cycle time period $D_c$ is selected so that it is no longer than the maximum amount of time delay which is tolerable for the most delay sensitive traffic handled by the node 10. Preferably, this cycle time period may be in the range of about 1 to 2 msec. In the example of the invention shown in FIG. 5, the cycle time period is selected to be no longer than about 1.2 msec. Since the output link 28 has a bandwidth of 150 mb/sec., this 1.2 msec. time period amounts to the withdrawal of a total of 450 ATM cells from the queuing circuits in FIG. 5 and the transmission of those 450 cells onto the output link 28.

The traffic contained in the queuing circuits in FIG. 5 is guaranteed a minimum percentage of the total bandwidth available on the output link 28. This is accomplished by the server 48 withdrawing a certain predetermined number of cells from each of the queuing circuits during a cycle time period $D_c$. In the example shown in FIG. 5, the server 48 withdraws thirty cells from the voice queue 32 on line 33 and transmits those thirty voice cells onto the output link 28. The bandwidth on line 33 and the bandwidth on output link 28 devoted to voice traffic thus is 10 Mb/sec. After those voice cells have been transmitted, the server 48 then withdraws thirty cells from the low speed data queue 34 on a line 35. The bandwidth of line 35 and the bandwidth on output link 28 devoted to low speed-data thus is 10 Mb/sec. like that for voice traffic. Similarly, during the cycle time period the server 48 withdraws sixty cells from CBR video queue 36 on line 37, thirty cells from CBR video queue 38 on line 39, sixty cells from LAN-to-LAN queue 40 on line 41, and ninety cells from VBR video queue 42 on line 43. Thus, the one CBR video call associated with queue 36 is given 20 Mbit/sec. of the total 150 mbit/sec. available bandwidth on output link 28. The other CBR video call associated with queue 38 is given 10 Mbit/sec. of the total 150 Mbit/sec. available on the link 28. (These CBR video bit rates are only illustrative; the actual rates would depend on the coding a compression algorithms used in practice.) Statistically multiplexed LAN-to-LAN calls get 20 Mbit/sec. of the 150 Mbit/sec. total bandwidth available on link 28. The remainder of the available bandwidth on line 28 is devoted to the two bulk delivery calls illustrated in FIG. 5. Specifically, the server 48 withdraws fifteen cells from bulk data queue 44 on line 45 during the cycle time period and server 48 withdraws 135 cells from video delivery queue 46 on line 47 during that same time period and delivers those cells onto output link 28. Bulk data thus is given 5 Mbit/sec. on the link 28 and video delivery data is given 45 Mbit/sec. on the link 28.

The server 48 in effect defines a cycle time period $D_c$ during which it will retrieve cells from all of the queues having cells to send. The server 48 divides the cycle time period into time slices $T_1, T_2, \ldots T_n$, assigns a time slice to each of the queues, and permits each queue to empty cells onto the output link 28 during its respective time slice. The server 48 accomplishes this by visiting each queue in sequence, removing a predetermined number of cells from each queue, and then moving on to remove a predetermined number of cells from the next queue in sequence. All queues are visited within the next cycle time period $D_c$ defined by the server 48. At the completion of the cycle time period, the server 48 repeats the cycle of visiting each queue and removing respective predetermined numbers of cells from each queue within the cycle time period. If any one of the queues contains no cells, then the server completely passes over the empty queue and immediately moves on to the next queue in sequence to remove its allotted number of cells. If any of the queues contains a number of cells which is less than the predetermined number of cells the server 48 is scheduled to remove during a cycle time period, then the server 48 removes cells from that queue until it is empty and immediately moves on to the next queue to remove its allotted number of cells. Thus, the server 48 may complete a cycle of removing cells from all queues in an amount of time which is less than the cycle time period.

As described above, the dynamic time slice server 48 shown in FIG. 5 thus services all the queues by cyclically visiting each queue and allocating a slice of time to it so that a predetermined number of cells may be removed from the queue and placed on the output link 28. The time slice allocated to a queue is proportional to the amount of bandwidth on the output link 28 required by that queue. In general, the number of queues "n" changes as the number of traffic classes handled by the output link 28 in node 10 changes. Also, "n" varies with the number of Type 1A and Type 2 calls directed to the output link 28 because dedicated queues are required for each of these calls. As "n" varies, the time slice allocations $T_1, T_2 \ldots T_n$ for each of the queues change to reflect the proportionate bandwidth requirements for all traffic classes or HBS calls in service. The units of the time slices are expressed in terms of numbers of ATM cells as described above.

Although not illustrated in FIG. 5, there may be one queue at each link dedicated solely to signaling traffic (including call set-up, call tear-down, network congestion controls, etc.). The signalling cells may be identified either by their dedicated VCI's (for common channel signalling) or by their payload type (for channel associated signalling). This queue would have a generous allocation of buffers to ensure no cell loss (for example, a probability of signalling cell loss of less than $10^{-9}$). Its time slice parameter $T_0$ should be chosen so that signalling cells would have a negligible probability of waiting more than one cycle time period before delivery onto the output link 28.

A variety of servicing schemes may be applied to call admittance and setup depending on the characteristics and requirements of the various traffic classes considered above.

Servicing Scheme For Isochronous HBS Traffic (Type 1A):

The user first makes a call setup request for allocation of a virtually reserved peak bandwidth. The network sends a bandwidth allocation request to all nodes enroute to the destination. The user is guaranteed the requested peak bandwidth for the duration of the call. Any efficient routing scheme may be used to find an appropriate path through the network along which the requested bandwidth is reserved.

Servicing Scheme For Non-Isochronous HBS Traffic (Type 1B):

Calls of this type are divided into several subclasses, for example, LAN-to-LAN and VBR video subclasses. Calls within each of these subclasses are statistically multiplexed into a single queue. Each call subclass is given a guaranteed minimum bandwidth by virtue of the server allocating a finite time slice to each of the queues. Bandwidth versus capacity tables (i.e., traffic tables) are maintained for each subclass. A traffic table indicates the amount of bandwidth needed to multiplex a given number of calls for that call subclass. The table may be determined by taking into consideration the burstiness, coding type, and performance requirements for the call subclass under consideration. If spare bandwidth is available on the output link 28, a new call of this type is admitted and the bandwidth (i.e., time slice allocation $T_i$) for this call subclass is increased as specified in the capacity versus bandwidth table. When a call is completed, the bandwidth is relinquished by lowering the time slice allocation $T_i$ for its subclass. Placing each of the subclasses within this type of call traffic in a separate queue facilitates the appropriate service of each subclass in accordance with its individual performance requirements. Any unused bandwidth, due to statistical fluctuations in the activity of the calls in progress, is momentarily made available to other traffic in the system. As in the case of the Type 1A calls described above, any efficient routing scheme may be used to find an appropriate path through the network for each call. The capacity versus bandwidth tables can be refined or updated as traffic characteristics become better known or technology improves. For example, new and more efficient video compression methods may dictate a change to the traffic tables.

Servicing Scheme For Delay Insensitive HBS Traffic (Type 2):

In accordance with one aspect of this invention, there are three illustrative schemes for servicing the Type 2 delay insensitive HBS traffic. Servicing schemes A and B differ depending on whether information storage is located in a network node or in customer premises equipment. Schemes A and B are based on the notion of deferred delivery with bandwidth reservation. Scheme C transmits Type 2 ATM cells with low priority and no bandwidth guarantee. In scheme C, Type 2 ATM cells use any cell slots that are unused by all other classes during the service cycles of the server 48.

Servicing Scheme A For Type 2 Traffic

The user first sets up a connection with the nearest node in the network which services Type 2 call traffic. No end-to-end connection is set up at this time. This Type 2 service node accepts bulk information from the user and stores it in bulk memory. The user notifies the service node of the intended destination for the bulk information and then disconnects from the service node. A second stage of call set up is done by the network during low traffic periods. The service node negotiates with other nodes enroute to the designated destination for an appropriate bandwidth guarantee so that the transmission of the bulk information may be completed within a user specified deadline. Next, the bulk information is transported through the network to its destination. A service node at the receiving end receives and stores the bulk data and notifies the intended recipient. The call is completed to the recipient, the bulk information is delivered to the recipient, and the sender is given a service completion message.

Servicing Scheme B For Type 2 Traffic

The sender first specifies the size of the transaction, a delay tolerance, and the bandwidth required. The network then registers a request for call set up. The bulk information awaits transmission at the sender's terminal rather than in a service node. The call is set up during a slack period in the network but within the deadline specified by the sender. The bulk information then is transported through the network to the recipient with an appropriate bandwidth guarantee to assure delivery within the sender's specified deadline.

Servicing Scheme C For Type 2 Traffic

In this scheme, all delay insensitive bulk traffic calls are serviced through a low priority queue established at each link. This queue has a low priority in the sense that it has no bandwidth guarantee. It uses any spare bandwidth (idle cell slots) in each cycle of the server 48. In order to assure that there is no cell loss due to buffer overflow, a backward congestion notification scheme is used. In other words, a STOP/SEND signal may be sent to appropriate nodes by a node whose buffer is about to overflow. The low priority traffic in the queue is transmitted when spare bandwidth is available and the link has a SEND status.

Servicing Scheme For Low- Or Medium-Bandwidth SMS Traffic (Type 3):

These calls are handled in a manner similar to the manner in which Type 1B calls are handled as described above. Different call set up procedures (acceptance and routing) may be used for these kinds of calls. Type 3 calls may be divided into several different subclasses, for example, voice, low-speed data, and interactive images. Each of these subclasses will have its own queue.

Figure 6:
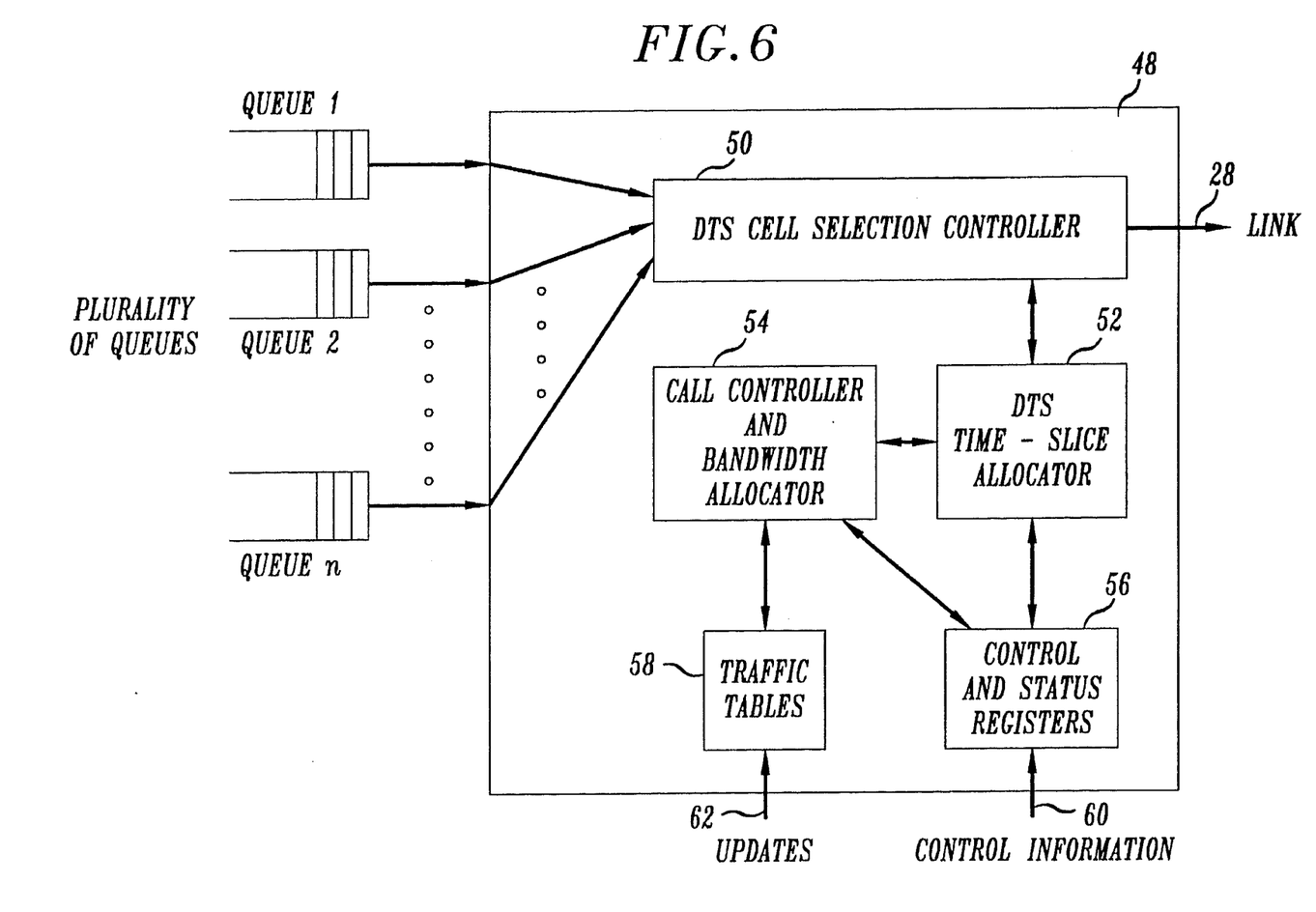
FIG. 6 is a block diagram illustrating in more detail the dynamic time slice server shown in FIG. 5.

FIG. 6 shows the details of the circuitry in the dynamic time slice server 48. The server 48 contains a cell selection controller 50 which selectively connects each of a plurality of queues 1, 2, . . . n to output link 28 to cause transmission of a predetermined number of ATM cells from each of those queues in a predetermined cycle time period $D_c$. The cell selection controller is connected to a time slice allocator 52 which determines and controls how many ATM cells are to be withdrawn from each of the queues during the predetermined cycle time period. A call controller and bandwidth allocator 54 makes call admittance and denial decisions and controls the time slice allocations made by the time slice allocator 52 as a function of call traffic level. This control of time slice allocations is made by the call controller and bandwidth allocator 54 in light of information obtained from control and status registers 56 about the amount of link bandwidth which is currently in use. The call controller and bandwidth allocator 54 also admits or denies additional calls based on the availability of bandwidth.

The call controller and bandwidth allocator 54 is responsive to information contained in call traffic tables 58 relating to the bandwidth needed to statistically multiplex successfully a plurality of call traffic levels for each call classification. It is also responsive to information contained in the registers 56 relating to the amount of link bandwidth currently in use. The registers 56 also contain information about which scheduling scheme A, B, or C is to be used to handle low priority Type 2 traffic. The choice of which scheme to use may be communicated to the registers 56 by way of a control information line 60. The information contained in the traffic tables 58 may be updated by means of an update line 62.

Figure 7:
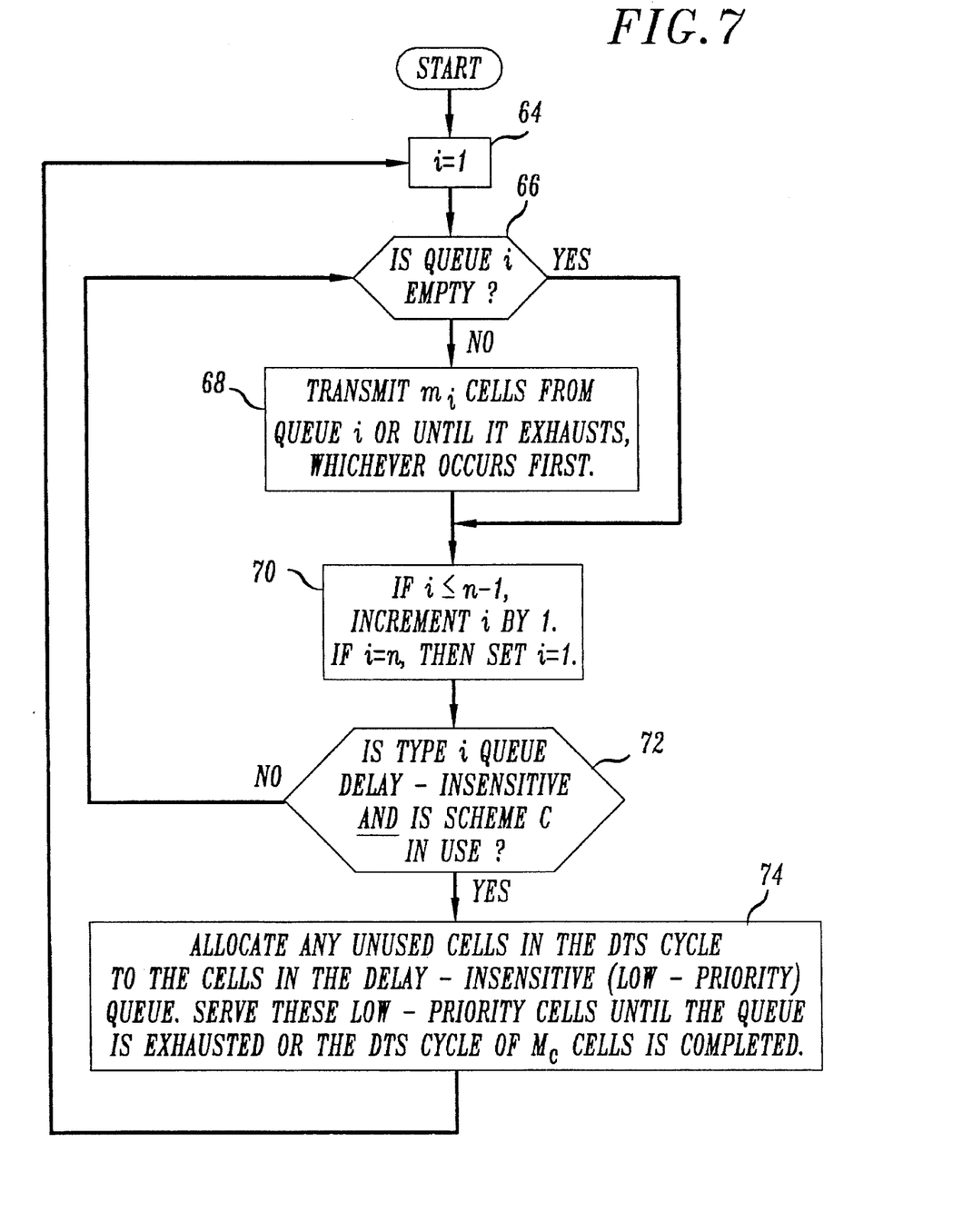
FIG. 7 is a flow chart illustrating in more detail the cell selection controller of FIG. 6.

FIG. 7 is a flow chart illustrating the nature of the cell selection controller 50 in FIG. 6. The operation of the controller 50 begins in a block 64 in which an index is set to one. In block 66, a check is made to see if the nth queue is empty. If it is not, block 68 causes a predetermined number $m_i$ of cells to be extracted from the ith queue and transmitted on the output link 28. ($m_i = T_i/\tau$ where $T_i$ is the time slice allocated to queue i and $\tau$ is the cell transmission time.) If there are less than $m_i$ cells in the ith queue, then cells are extracted and transmitted until the ith queue is empty. When $m_i$ cells have been transmitted or the ith queue has been emptied, the index i is incremented by one in block 68, if i is less than or equal to n−1, where n is the number of queues visited by the server 48 during the current cycle time period. If i is equal to n, then the index i is set to one in block 70. If the ith queue is empty, as determined in block 66, then the operation of block 70 is made directly from block 66 bypassing block 68.

After the operation of block 70, the cell selection controller 50 makes a determination in block 72 to see if the ith queue contains delay-insensitive traffic and scheme C described above is in use for that kind of traffic. If the answer is no, the operation of the controller 50 returns to the input of block 66, the operation of which is repeated along with that of successive blocks described above. If the answer is yes in block 72, then in block 74 any unused cells as defined by the length of the server's cycle time period $D_c$ is allocated to this delay insensitive low priority queue. In other words, these low priority cells are withdrawn from the queue and transmitted on the output link 28 until the total number of cells withdrawn from the plurality of queues currently being served by the DTS server 48 equals the total number of cells to be withdrawn from the queues during the cycle time period. This number of cells is indicated by a variable $M_c$ in FIG. 7 and is equal to the previously described 450 cells for the circuit shown in FIG. 5. When the operation of block 74 has been completed, the operation of the cell selection controller 50 returns to block 64. At this point, the operation of block 64 and the operation in successive blocks is repeated as described above.

Figure 8:
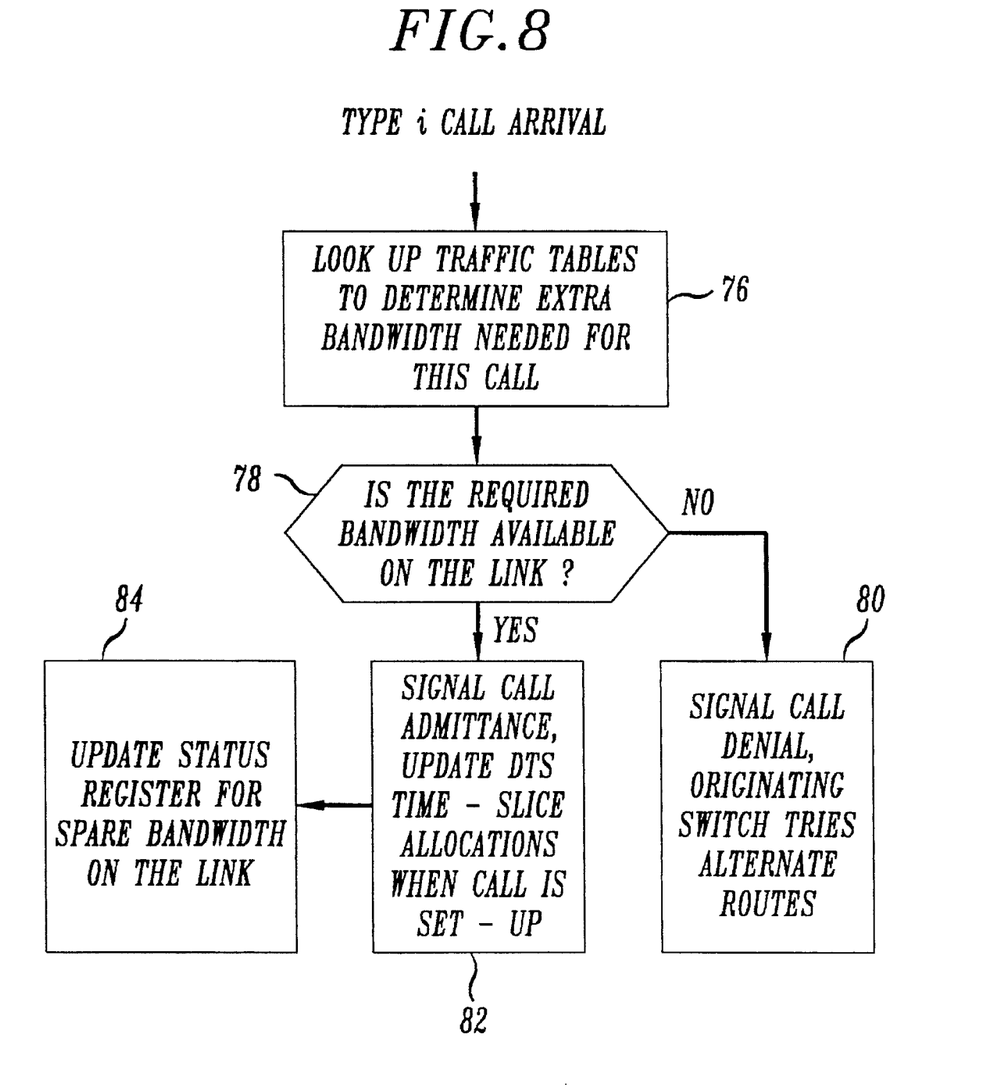
FIGS. 8 and 9 are flow charts illustrating in more detail the call controller and bandwidth allocator shown in FIG. 6.
Figure 9:
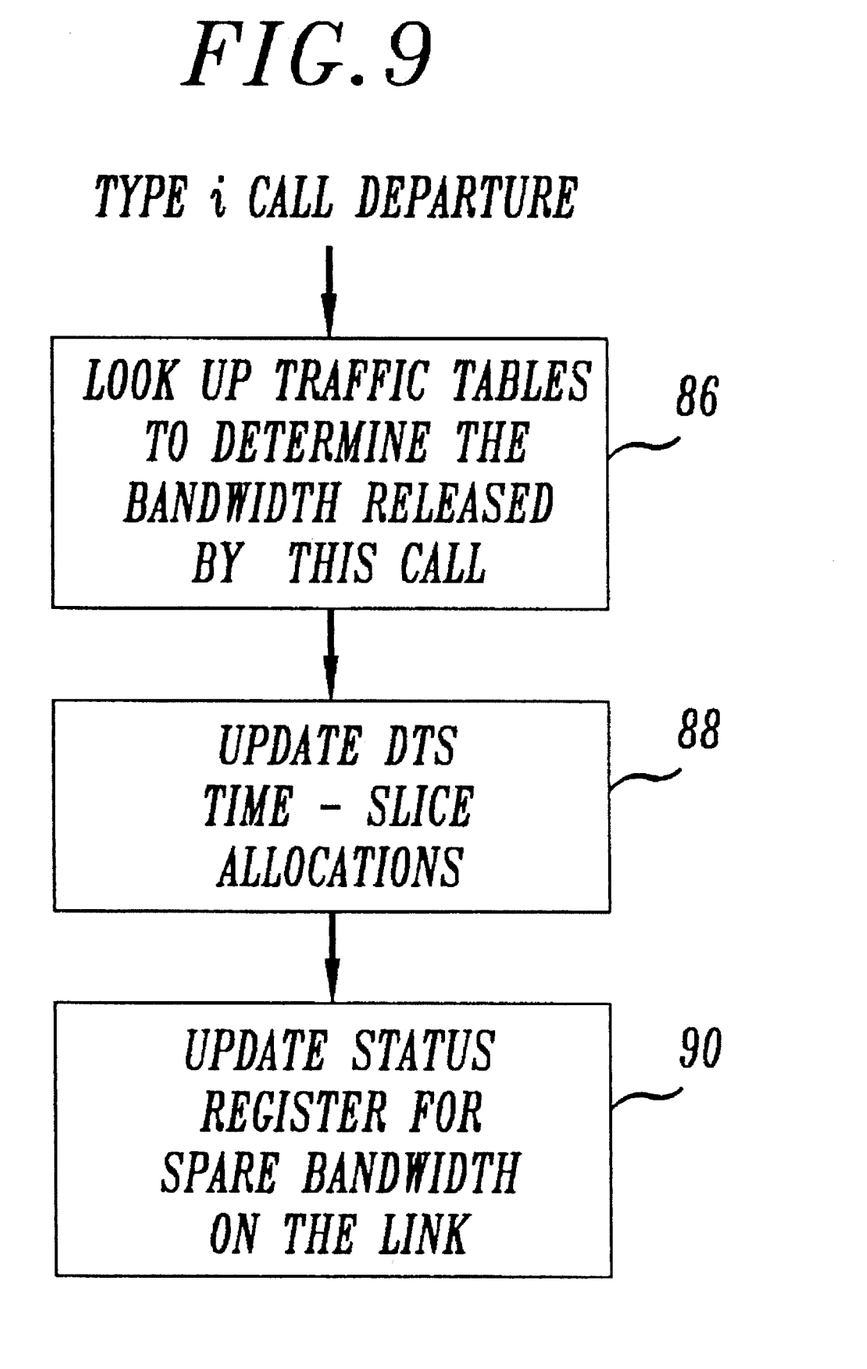

FIGS. 8 and 9 are a flow chart representing the details of the call controller and bandwidth allocator 54 shown in FIG. 6. FIG. 8 is a flow chart showing the operation of the call controller and bandwidth allocator 54 in response to the arrival of a call to be transmitted on the output link 28. When a type i call arrives, block 76 determines the bandwidth needed to accommodate the call from the traffic tables 58. The circuit then makes a determination to see if the required bandwidth is available on link 28 in block 78. The circuit of FIG. 8 obtains this information from the control and status registers 56 in FIG. 6. If the required bandwidth is not available on link 28, the call is denied in block 80 and the originating switch may try alternative routes to complete the call. If the required bandwidth is available on link 28, then the call is admitted in block 82 and the time slice allocations are updated when the call is set up. The registers 56 are updated in block 84 in light of the admittance of this call by the call controller and bandwidth allocator 54.

FIG. 9 is a flow than representing the behavior of the call controller and bandwidth allocator 54 in response to the departure of a call. The circuit first determines how much bandwidth should be released by the departure of the call in block 86. This determination is made in light of the information stored in the traffic tables 58. The circuit of FIG. 9 then updates the time slice allocations in block 88 and updates the registers 56 in block 90 regarding the spare bandwidth now available on the link 28 in light of the release of bandwidth caused by the departure of the subject call.

Figure 10:
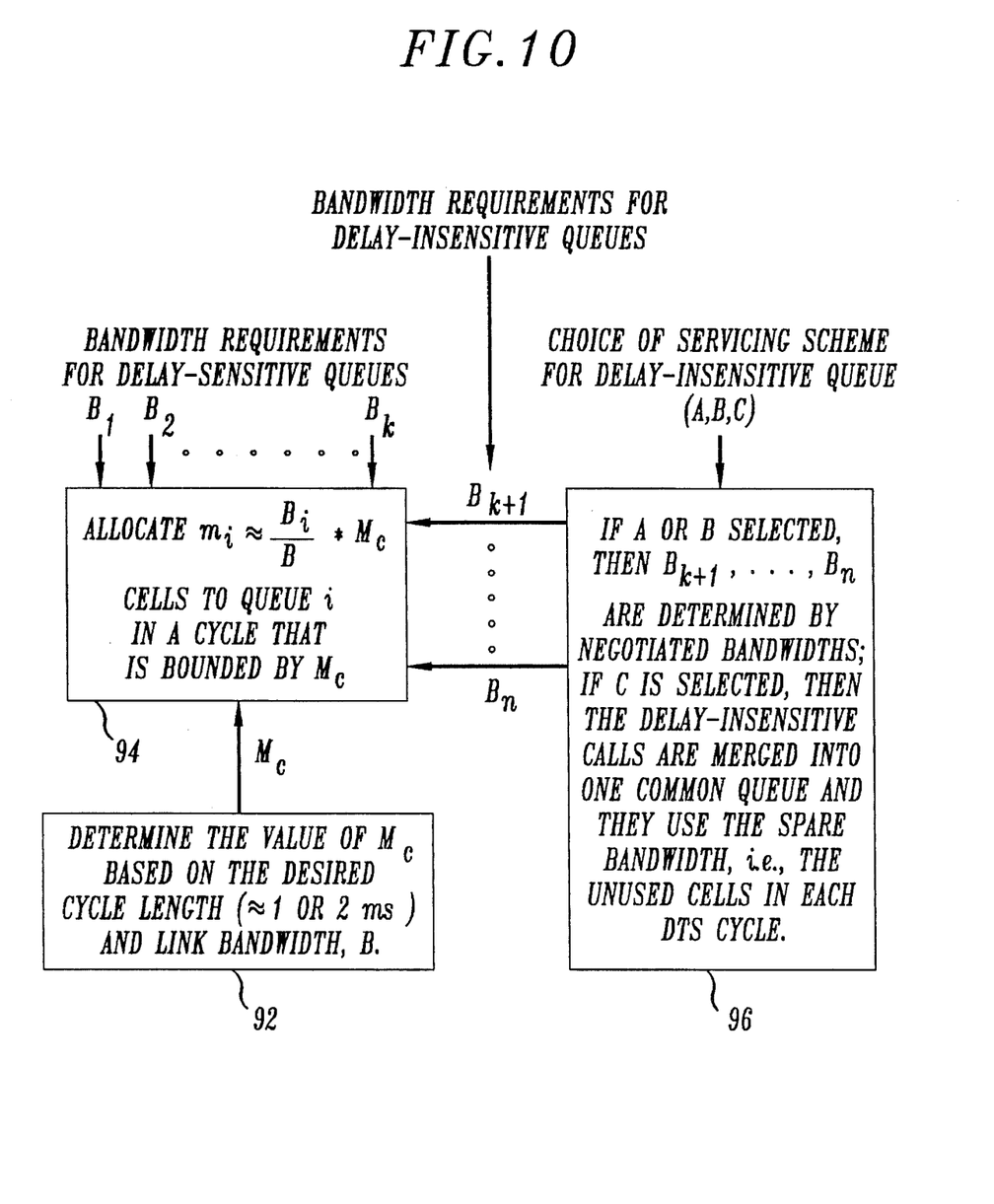
FIG. 10 is a block diagram illustrating the dynamic time slice allocator shown in FIG. 6.

FIG. 10 shows the structure of the time slice allocator 52 in FIG. 6. A circuit 92 produces a signal relating to the preselected value $M_c$ which represents the total number of cells withdrawn from the queuing circuits shown in FIGS. 5 and 6 during a desired cycle time period, defined by the server 48. As described above, this cycle length may be about 1 msec. to about 2 msec. In the example of the invention described in FIG. 5, the value $M_c$ is 450 ATM cells for the described link bandwidth of 150 Mbit/sec. Signals $B_1, B_2, \ldots B_k$, representing the required bandwidths for respective delay sensitive queues, are input to a computation circuit 94 which determines the number of cells $m_i$ which the server 48 is to withdraw from the ith queue during the previously described service cycle time period $D_c$ which is defined by the selected magnitude $M_c$. A circuit 96 receives a signal as an input representing which servicing scheme A, B, or C is to be used for the delay insensitive queues. If scheme A or scheme B has been selected, then the circuit 96, produces signals $B_{k+1}, \ldots, B_n$, which are determined in light of negotiated bandwidth allocations. If scheme C has been selected, then the delay insensitive calls may be merged into one common queue and they use the spare bandwidth, namely, the unused cells, in each service cycle. The outputs of the circuit 96, $B_{k+1}, \ldots, B_n$, represent the bandwidth requirements for the delay insensitive queues which are used by the circuit 94 to compute the number of cells which are to be withdrawn from the delay insensitive queues for transmission on the output link 28.

Summary

This example of the invention provides a way to conveniently handle and integrate a wide variety of communications traffic handled by a broadband network. Bandwidth is effectively and fairly allocated and congestion is avoided. The dynamic time slice server guarantees a desired bandwidth to calls requiring a fixed wide bandwidth for the duration of the call which facilitates setting up circuit-like constant bit rate connections in an asynchronous transfer mode network. Statistical multiplexing of calls is done when applicable. Call admittance is based upon capacity versus required bandwidth tables for statistically multiplexed calls. This invention is an efficient way of combining fixed bandwidth constant bit rate services with statistically multiplexed services. Each call class is placed in a separate queue, acting as a virtual bandwidth pipe, which allows each call class to be served according to its unique performance requirements. Any bandwidth unused by a call class or a high bandwidth service call, is momentarily made available to other traffic present in the multiplexer. Delay insensitive high bandwidth bulk traffic (e.g. bulk data and video delivery) is stored in customer premises equipment or in a service node. It may be transmitted via a secondary call set up during slack periods in the network. Alternatively, the delay insensitive high bandwidth traffic may be served through a low priority queue established at each link and by allowing the low priority calls to fill the unused portion of the dynamic time-slice service cycles.

I claim:

1. A communications apparatus, comprising:

a first queuing means for receiving information packets associated with low bandwidth calls;

a second queuing means for receiving information packets associated with high bandwidth delay sensitive calls;

a third queuing means for receiving information packets associated with high bandwidth delay insensitive calls;

a multiplexing means for sequentially and cyclically drawing a predetermined number of information packets during successive service cycle time periods from each of the first, second, and third queuing means and combining those packets on a single output line; and a variable scheduling means, associated with the third queuing means, for providing a plurality of selectable scheduling schemes for completing the high bandwidth delay insensitive calls.

2. The apparatus of claim 1, in which the fast queuing means comprises:

a fast queue for receiving statistically multiplexed voice calls; and a second queue for receiving statistically multiplexed low bandwidth data calls.

3. The apparatus of claim 1, in which the second queuing means comprises:

a first queue for receiving variable bit rate statistically multiplexed video calls; and a second queue for receiving statistically multiplexed LAN-to-LAN calls.

4. The apparatus of claim 1, in which the second queuing means comprises:

one or more queues each for receiving a call requiring a guaranteed peak bandwidth for a predetermined pan or all of the call.

5. The apparatus of claim 4, in which the one or more queues each receive a constant bit rate call.

6. The apparatus of claim 5, in which the one or more queues each receive a constant bit rate video call.

7. The apparatus of claim 1, further comprising:

means responsive to unused bandwidth on the single output line for selectively admitting additional calls into selected ones of the queuing means.

8. The apparatus of claim 7, further comprising:

a call traffic table containing data relating to levels of call traffic as a function of required bandwidth, the admitting means being responsive to the dam in the call traffic table.

9. The apparatus of claim 1, in which the third queuing means comprises:

one or more queues each for receiving a call relating to a bulk information transfer.

10. A broadband communications network, comprising:

a plurality of network nodes, each having at least one input and one output;

a plurality of links connecting selected ones of the outputs with selected ones of the inputs;

a queuing means associated with each of the links, each of the queuing means comprising:

a first queuing circuit for receiving information packets associated with statistically multiplexed low bandwidth calls;

a second queuing circuit for receiving information packets associated with delay sensitive and isochronous high bandwidth calls;

a third queuing circuit for receiving information packets associated with statistically multiplexed delay sensitive and non-isochronous high bandwidth calls; and a fourth queuing circuit for receiving information packets associated with delay insensitive high bandwidth calls;

a multiplexing means associated with each queuing means for defining a predetermined cycle time period during which the first, second, third, and fourth queuing circuits are each permitted to empty a respective predetermined number of information packets onto its respective link during respective predetermined slices of time within the predetermined cycle time period; and a variable scheduling means for providing a plurality of selectable scheduling schemes for completing the high bandwidth delay insensitive calls.

11. The network of claim 10, further comprising:

means responsive to unused bandwidth on one of the links for selectively admitting additional calls into selected ones of the queuing circuits.

12. The network of claim 11, further comprising:

call traffic tables containing data relating to levels of call traffic as a function of required bandwidth, the admitting means being responsive to the data in the call traffic tables.

13. The apparatus of claim 1, further comprising:

a means for storing in the network bulk information relating to at least one delay insensitive high bandwidth call;

a means for delivering the bulk information when a predetermined amount of traffic is being handled; and a means for providing a predetermined bandwidth guarantee for delivery of the bulk information from the means for storing.

14. A broadband communications network, comprising:

a plurality of network nodes, each having at least one input and one output;

a plurality of links connecting selected ones of the outputs with selected ones of the inputs;

a queuing means associated with each of the links, each of the queuing means comprising:

a first queuing circuit for receiving information packets associated with statistically multiplexed low bandwidth calls;

a second queuing circuit for receiving information packets associated with delay sensitive and isochronous high bandwidth calls;

a third queuing circuit for receiving information packets associated with statistically multiplexed delay sensitive and non-isochronous high bandwidth calls; and a fourth queuing circuit for receiving information packets associated with delay insensitive high bandwidth calls; and a multiplexing means associated with each queuing means for defining a predetermined cycle time period during which the first, second, third, and fourth queuing circuits are each permitted to empty a respective, predetermined number of packets onto its respective link during respective predetermined slices of time within the predetermined cycle time period;

in which at least one of the network nodes comprises:

a service node having a means for storing bulk information relating to at least one delay insensitive high bandwidth call, a means for delivering the bulk information when a predetermined amount of traffic is being handled by the network, and a means for providing a predetermined bandwidth guarantee for the bulk information delivery;

in which the memory is not located in customer premises equipment of a sender of the bulk information.

15. A broadband communications network, comprising:

a plurality of network nodes, each having at least one input and one output;

a plurality of links connecting selected ones of the outputs with selected ones of the inputs;

a queuing means associated with each of the links, each of the queuing means comprising:

a first queuing circuit for receiving information packets associated with statistically multiplexed low bandwidth calls;

a second queuing circuit for receiving information packets associated with delay sensitive and isochronous high bandwidth calls;

a third queuing circuit for receiving information packets associated with statistically multiplexed delay sensitive and non-isochronous high bandwidth calls; and a fourth queuing circuit for receiving information packets associated with delay insensitive high bandwidth calls; and a multiplexing means associated with each queuing means for defining a predetermined cycle time period during which the first, second, third, and fourth queuing circuits are each permitted to empty a respective predetermined number of packets onto its respective link during respective predetermined slices of time within the predetermined cycle time period;

in which at least one of the network nodes comprises:

means for receiving information from a sender relating to a transaction size, a delay tolerance, and a required bandwidth for a delay insensitive high bandwidth call; and means responsive to the information received from a sender for transmitting bulk information stored in customer premises equipment when a predetermined amount of traffic is being handled by the network.

16. The network of claim 10, in which the network nodes comprise:

a low priority queue at each link for handling bulk information transfers using spare bandwidth without any bandwidth guarantee.

17. A broadband integrated services digital telecommunications network in accordance with the network of claim 10.

18. A broadband asynchronous transfer mode telecommunications network in accordance with the network of claim 10.

19. A method of allocating bandwidth in a broadband packet-switched telecommunications network, comprising the steps of:

classifying calls in the network in accordance with bandwidth, isochronicity, and delay sensitivity;

queuing information packets for each call class into a respective queuing circuit;

defining a service cycle time period during which a predetermined number of information packets is removed from each of the queuing circuits;

removing the predetermined numbers of information packets from each of the queuing circuits during the cycle time period; and providing a plurality of scheduling schemes for completing high bandwidth delay insensitive calls.

20. The method of claim 19, further comprising the step of:

admitting additional calls to a queuing circuit in response to unused bandwidth in the network.

21. The method of claim 19, further comprising the step of:

admitting additional calls to a queuing circuit in response to data contained in a call traffic table which relates levels of call traffic to required bandwidth.

22. The apparatus of claim 1, further comprising:

a means for receiving information from a sender relating to a transaction size, a delay tolerance, and a required bandwidth for a delay insensitive high bandwidth call; and a means responsive to the information received from the sender for transmitting the bulk information stored in customer premises equipment when a predetermined amount of traffic is being handled.

23. A method of allocating bandwidth in a broadband packet-switched telecommunications network, comprising the steps of:

classifying calls in the network in accordance with bandwidth, isochronicity, and delay sensitivity;

queuing information packets for each call class into a respective queuing circuit;

defining a service cycle time period during which a predetermined number of information packets is removed from each of the queuing circuits;

removing the predetermined numbers of information packets from each of the queuing circuits during the cycle time period;

storing at least one high-bandwidth delay insensitive call comprising bulk information in the network; and delivering that bulk information when a predetermined amount of traffic is being handled by the network with a predetermined bandwidth guarantee along a path through the network.

24. A method of allocating bandwidth in a broadband packet-switched telecommunications network, comprising the steps of:

classifying calls in the network in accordance with bandwidth, isochronicity, and delay sensitivity;

queuing information packets for each call class into a respective queuing circuit;

defining a service cycle time period during which a predetermined number of information packets is removed from each of the queuing circuits;

removing the predetermined numbers of information packets from each of the queuing circuits during the cycle time period;

receiving information from a sender relating to a transaction size, a delay tolerance, and a required bandwidth for a high-bandwidth delay insensitive call; and transmitting bulk information stored in customer premises equipment connected to the network in response to the information from the sender when a predetermined amount of traffic is being handled by the network.

25. The method of claim 19, further comprising the steps of:

directing a high-bandwidth delay insensitive call to a low priority queue in the network; and transmitting the call through the network without bandwidth guarantee using spare bandwidth not used by other calls.

* * * * *

UNITED STATES PATENT AND TRADEMARK OFFICE
CERTIFICATE OF CORRECTION

PATENT NO.   : 5,463,620
DATED        : October 31, 1995
INVENTOR(S)  : Kotikalapudi Sriram It is certified that error appears in the above-identified patent and that said Letters Patent is hereby corrected as shown below:

In Column 11, Claim 4, Line 52, change "pan" to --part--.
                Claim 8, Line 65, change "dam" to --data--.

Signed and Sealed this

Twenty-first Day of April, 1998

Attest:

BRUCE LEHMAN

*Attesting Officer*         *Commissioner of Patents and Trademarks*